United States Patent
Wang et al.

(10) Patent No.: US 9,531,458 B2
(45) Date of Patent: Dec. 27, 2016

(54) METHOD, DEVICE AND SYSTEM FOR PRECODING BASED ON COMP

(71) Applicant: ZTE Corporation, Shenzhen (CN)

(72) Inventors: Yanwen Wang, Shenzhen (CN); Yongqiang Wang, Shenzhen (CN); Xi'an Liang, Shenzhen (CN); Tao Jin, Shenzhen (CN); Saijin Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/417,465

(22) PCT Filed: Jul. 26, 2013

(86) PCT No.: PCT/CN2013/080155
§ 371 (c)(1),
(2) Date: Jan. 26, 2015

(87) PCT Pub. No.: WO2014/019473
PCT Pub. Date: Feb. 6, 2014

(65) Prior Publication Data
US 2015/0188614 A1 Jul. 2, 2015

(30) Foreign Application Priority Data
Jul. 30, 2012 (CN) .......................... 2012 1 0268121

(51) Int. Cl.
*H04W 4/00* (2009.01)
*H04B 7/216* (2006.01)
(Continued)

(52) U.S. Cl.
CPC ............ *H04B 7/0456* (2013.01); *H04B 7/024* (2013.01); *H04L 1/00* (2013.01); *H04L 5/0035* (2013.01); *H04L 25/03949* (2013.01)

(58) Field of Classification Search
CPC ... H04B 7/0434; H04B 7/0617; H04B 7/0689; H04L 1/0025; H04L 25/03343
See application file for complete search history.

(56) References Cited

U.S. PATENT DOCUMENTS

| | | | |
|---|---|---|---|
| 8,903,408 B2 * | 12/2014 | Tian ...................... | H04B 7/024 370/328 |
| 2009/0117911 A1 * | 5/2009 | Molisch ................ | H04B 7/022 455/450 |

(Continued)

FOREIGN PATENT DOCUMENTS

| CN | 102065434 A | 5/2011 |
|---|---|---|
| CN | 102231659 A | 11/2011 |
| CN | 102291210 A | 12/2011 |

OTHER PUBLICATIONS

International Search Report for corresponding application PCT/CN2013/080155 filed Jul. 26, 2013; Mail date Oct. 31, 2013.
(Continued)

*Primary Examiner* — Melanie Jagannathan
(74) *Attorney, Agent, or Firm* — Cantor Colburn LLP (57) ABSTRACT

A method, a device and a system for precoding based on CoMP are provided. The method includes: a serving base station receives an expected PMI of a terminal associated with the serving base station and a leakage PMI of a terminal associated with a cooperation base station, which is sent by the cooperation base station, wherein the expected PMI is corresponding to encoding codeword in an expected terminal direction, and the leakage PMI is corresponding to encoding codeword in an interference direction; the serving base station selects expected encoding codeword according to the expected PMI and selecting leakage precoding codeword according to the leakage PMI; and the serving base station convolve the expected encoding codeword and the leakage precoding codeword to obtain precoding codeword used for signal transmission by the serving base station. In the present invention, by use of the CoMP technology, the accuracy of reducing interference of edge user terminals is improved.

10 Claims, 6 Drawing Sheets

(51) Int. Cl.
*H04B 7/04* (2006.01)
*H04L 1/00* (2006.01)
*H04B 7/02* (2006.01)
*H04L 5/00* (2006.01)
*H04L 25/03* (2006.01)

(56) References Cited

U.S. PATENT DOCUMENTS

| | | | |
|---|---|---|---|
| 2010/0273495 A1* | 10/2010 | Onggosanusi | H04B 7/024 455/450 |
| 2011/0103247 A1* | 5/2011 | Chen | H04B 7/0452 370/252 |
| 2011/0319092 A1 | 12/2011 | Kim et al. | |
| 2012/0026940 A1* | 2/2012 | Barbieri | H04L 5/0032 370/328 |
| 2012/0045018 A1* | 2/2012 | Zhou | H04B 7/0434 375/296 |
| 2012/0275500 A1* | 11/2012 | Wang | H04B 7/0641 375/219 |
| 2012/0314787 A1* | 12/2012 | Park | H04B 7/0417 375/260 |
| 2014/0003272 A1* | 1/2014 | Benjebbour | H04B 7/024 370/252 |
| 2014/0153427 A1* | 6/2014 | Seo | H04L 1/20 370/252 |

OTHER PUBLICATIONS

Supplementary European Search Report issued Jul. 2, 2015 re: Application No. 13 82 6221, pp. 1-7, CN 102 065 434 A and US 2011/319092 A1.

* cited by examiner

Fig.1 (Prior Art)

A serving base station receiving an expected PMI of a terminal associated with the serving base station and a leakage PMI of a terminal associated with a cooperation base station, which is sent by the cooperation base station — S202

The serving base station selecting expected encoding codeword according to the expected PMI and selecting leakage precoding codeword according to the leakage PMI — S204

The serving base station convolving the expected encoding codeword and the leakage precoding codeword to obtain precoding codeword used for signal transmission by the serving base station — S206

METHOD, DEVICE AND SYSTEM FOR PRECODING BASED ON COMP

TECHNICAL FIELD

The present invention relates to the field of communications, in particular to a method, a device and a system for precoding based on coordinated multi-point transmission (CoMP).

BACKGROUND

In the 3d Generation Partnership Project (3GPP) system, the coordinated multi-point transmission technology, as a technology used for solving inter-cell interference so as to improve the spectral efficiency of cell edges and cells, has undergone in-depth research in the LTE R10, but because of the time, the design of some technologies has been simplified. At last, the design of channel state information pilot frequency which is compatible to CoMP is continued to be studied in R10, and the study of the other technologies are pushed off to LTE R11 or later versions.

Figure 1:
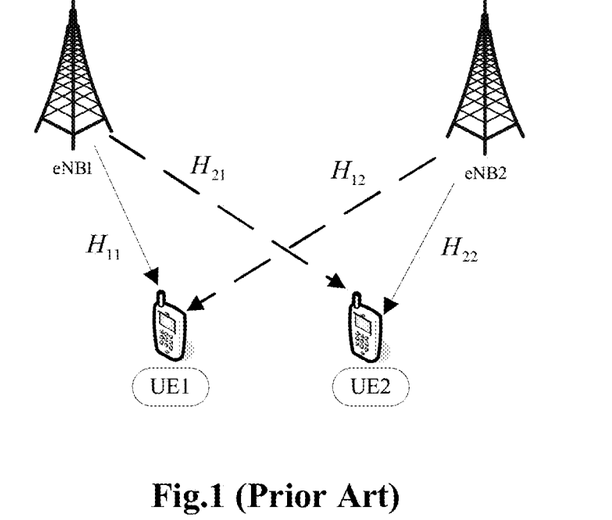
FIG. 1 is a schematic diagram of an application scenario of precoding based on CoMP in the related art where there are two cells and two users.

Through the interaction of channel information of mobile users among neighboring base stations, the neighboring base stations take can certain policies to avoid the interference, or multiple base stations carry out CoMP for the mobile users, which mainly for the mobile user at cell edge, so as to reduce the interference of edge users and improve the data throughput and spectral efficiency at the cell edge. FIG. 1 is an application schematic diagram of the CoMP technology in related art. As shown in FIG. 1, base stations include a serving base station and a cooperation base station. In the drawing, $H_{11}$ represents a channel from the serving cell $eNB_1$ to the present cell user $UE_1$, and $H_{21}$ represents a channel from the serving cell $eNB_1$ to the neighboring cell user $UE_2$. Likewise, $H_{22}$ represents a channel from the cooperation cell $eNB_2$ to the present cell user $UE_2$, and $H_{12}$ represents a channel from the cooperation cell $eNB_2$ to the neighboring cell user $UE_1$.

Typically, the form of partial feedback is adopted in CoMP uplink feedback, i.e. the UE does not completely feed back the channel matrix of the present cell and does not completely feed back the channel matrix of the neighboring cell, but feeds back partial channel information instead. Specifically, the UE feeds back the Precoding Matrix Indicator (abbreviated as PMI) of the channel of the present cell, and the UE also feeds back the Worst Companion Indicator (abbreviated as WCI) of the channel of the neighboring cell.

A method for realizing CoMP is provided in the related art. The neighboring cell eNB transmission provides a downlink precoding reference signal of a beamforming matrix used thereby; the mobile terminal obtains the optimal precoding matrix indicator according to the beamforming matrix used by the neighboring cell base station; the terminal acquires the Channel Quantity Identity (abbreviated as CQI) for interference coordination between area space cells, and feeds back the obtained optimal PMI and CQI to the serving cell base station; and the serving cell base station carries out scheduling by referring to the CQI value for interference coordination between area space cells of the terminal, and uses the optimal PMI to send Preferably pre-coded signals to the UE. By means of the method, the CoMP for interference coordination between area space cells of a terminal can be achieved. The codebook optimization method used in the method is cumbersome.

SUMMARY

As regards the problem in the related art that the codebook optimization method used in the CoMP technology is relatively complex, in the present invention a method and a device for precoding in the CoMP are provided to at least solve the above-mentioned problem.

According to an embodiment of the present invention, a method for precoding based on CoMP is provided. the method includes: a serving base station receives an expected PMI of a terminal associated with the serving base station and a leakage PMI of a terminal associated with a cooperation base station, which is sent by the cooperation base station, the expected PMI is corresponding to encoding codeword in an expected terminal direction, and the leakage PMI is corresponding to encoding codeword in an interference direction; the serving base station selects expected encoding codeword according to the expected PMI and selects leakage precoding codeword according to the leakage PMI; and the serving base station convolves the expected encoding codeword and the leakage precoding codeword to obtain precoding codeword used for signal transmission by the serving base station.

Preferably, before the serving base station receives an expected PMI of a terminal associated with the serving base station, the method further includes: the terminal associated with the serving base station estimates a channel matrix between the terminal associated with the serving base station and the serving base station; calculates expected precoding codeword according to the channel matrix between the terminal associated with the serving base station and the serving base station; and acquires the expected PMI according to the expected precoding codeword.

Preferably, calculating expected precoding codeword according to the channel matrix between the terminal associated with the serving base station and the serving base station includes: traversing all the codeword of a precoding codebook to determine ideal channels corresponding to all the codeword; traversing all the channels in the ideal channels to acquire the distance between the estimated value of the channel matrix and all the channels in the ideal channels; determining that the channel with the minimum distance is an expected branch ideal channel; and determining that the precoding codeword in the precoding codebook corresponding to the expected branch ideal channel are the expected precoding codeword.

Preferably, before receiving a leakage PMI of a terminal associated with a cooperation base station, which is sent by the cooperation base station, the method further includes: the terminal associated with the cooperation base station estimates a channel matrix between the terminal associated with the cooperation base station and the serving base station; calculating leakage precoding codeword according to the channel matrix between the terminal associated with the cooperation base station and the serving base station; and acquiring the leakage PMI according to the leakage precoding codeword.

Preferably, calculating leakage precoding codeword according to the channel matrix between the terminal associated with the cooperation base station and the serving base station includes: performing singular value decomposition on the channel matrix between the terminal associated with the cooperation base station and the serving base station to obtain a channel estimation codeword matrix; traversing channel estimation codeword in the channel estimation codeword matrix to acquire the distance between the channel estimation codeword and the codeword in the codebook; and determining that the channel estimation codeword with the maximum codeword distance is the leakage precoding codeword.

According to an embodiment of the present invention, a device for precoding based on CoMP is provided, which is applicable to a serving base station. The device includes: a receiving module is configured to receive an expected PMI of a terminal and a leakage PMI of a terminal associated with a cooperation base station, which is sent by the cooperation base station, the expected PMI is corresponding to encoding codeword in an expected terminal direction, and the leakage PMI is corresponding to encoding codeword in an interference direction;

a selection module is configured to select expected encoding codeword according to the expected PMI and select leakage precoding codeword according to the leakage PMI; and a convolution module is configured to convolve the expected encoding codeword and the leakage precoding codeword to obtain precoding codeword used for signal transmission by the serving base station.

According to an embodiment of the present invention, a system for precoding based on CoMP is provided. The system includes a serving base station, and the serving base station includes the above-mentioned device for precoding in CoMP. The system further includes a terminal associated with the serving base station, and the terminal associated with the serving base station includes:

a first estimation module is configured to estimate a channel matrix between the terminal where the estimation module resides and the serving base station;

a first calculation module is configured to calculate expected precoding codeword according to the channel matrix between the terminal and the serving base station; and a first acquisition module is configured to acquire an expected PMI according to the expected precoding codeword.

Preferably, the first calculation module includes: a first traversal module is configured to traverse all the codeword of a precoding codebook to determine ideal channels corresponding to all the codeword; a second traversal module is configured to traverse all the channels in the ideal channels to acquire the distance between the estimated value of the channel matrix and all the channels in the ideal channels; a first determination module is configured to determine that the channel with the minimum distance is an expected branch ideal channel; and a second determination module is configured to determine that the precoding codeword in the precoding codebook corresponding to the expected branch ideal channel are the expected precoding codeword.

Preferably, the system further includes a terminal associated with a cooperation base station corresponding to the serving base station, the terminal associated with a cooperation base station corresponding to the serving base station includes: a second estimation module is configured to estimate a channel matrix between the terminal associated with the cooperation base station and the serving base station; a second calculation module is configured to calculate leakage precoding codeword according to the channel matrix between the terminal associated with the cooperation base station and the serving base station; and a second acquisition module is configured to acquire a leakage PMI according to the leakage precoding codeword.

Preferably, the second calculation module includes: a first decomposition module is configured to perform singular value decomposition on the channel matrix between the terminal associated with the cooperation base station and the serving base station to obtain a channel estimation codeword matrix; a third traversal module is configured to traverse channel estimation codeword in the channel estimation codeword matrix to acquire the distance between the channel estimation codeword and the codeword in the codebook; and a third determination module is configured to determine that the channel estimation codeword with the maximum codeword distance are the leakage precoding codeword.

In the present invention, a serving base station receives an expected PMI of a terminal associated with the serving base station and a leakage PMI of a terminal associated with a cooperation base station, which is sent by the cooperation base station, the expected PMI is corresponding to encoding codeword in an expected terminal direction, and the leakage PMI is corresponding to encoding codeword in an interference direction; the serving base station selects expected encoding codeword according to the expected PMI and selects leakage precoding codeword according to the leakage PMI; and the serving base station convolves the expected encoding codeword and the leakage precoding codeword to obtain the precoding codeword. The problem in the prior art that the codebook optimization method used in the CoMP technology is complex is solved, which causes the problem of low accuracy in reducing interference of edge user terminals when realizing CoMP, and thereby achieves the effect of improving the accuracy in reducing interference of edge user terminals when the CoMP technology is used.

BRIEF DESCRIPTION OF THE DRAWINGS

Drawings, provided for further understanding of the present invention and forming a part of the specification, are used to explain the present invention together with embodiments of the present invention rather than to limit the present invention. In the drawings.

DETAILED DESCRIPTION OF THE EMBODIMENTS

The present invention is described below with reference to the accompanying drawings and embodiments in detail. Note that, the embodiments of the present invention and the features of the embodiments can be combined with each other if there is no conflict.

Figure 2:
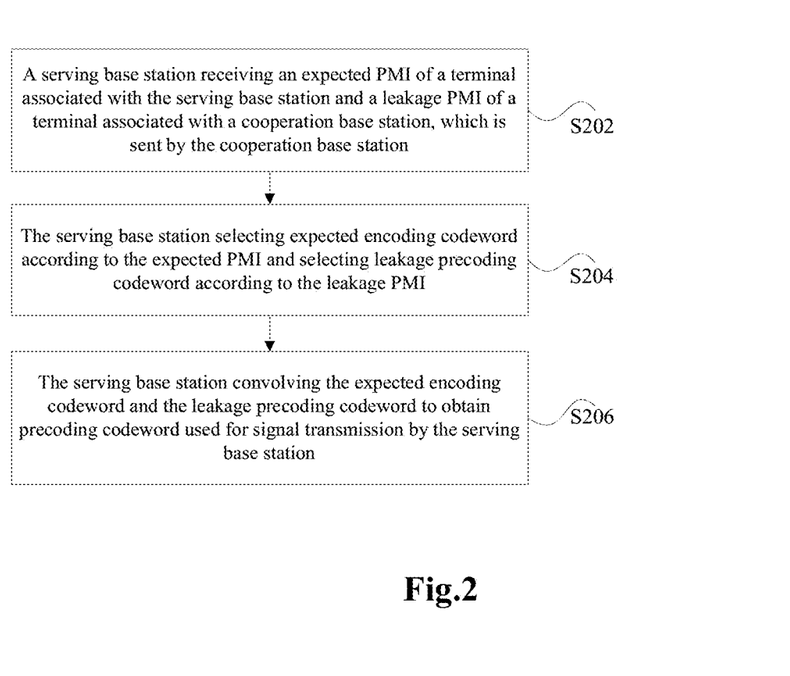
FIG. 2 is a flow chart of a method for precoding based on CoMP according to the embodiments of the present invention.

A method for precoding based on CoMP is provided in this embodiment. FIG. 2 is a flow chart of the method for precoding based on CoMP according to the embodiments of the present invention. As shown in FIG. 2, the flow includes step S202 to step S208 as below.

Step S202: a serving base station receives an expected PMI of a terminal associated with the serving base station and a leakage PMI of a terminal associated with a cooperation base station, the leakage PMI is sent by the cooperation base station, the expected PMI is corresponding to encoding codeword in an expected terminal direction, and the leakage PMI is corresponding to encoding codeword in an interference direction.

Step S204: the serving base station selects expected encoding codeword according to the expected PMI and selects leakage precoding codeword according to the leakage PMI.

Step S206: the serving base station convolves the expected encoding codeword and the leakage precoding codeword to obtain precoding codeword used for signal transmission by the serving base station.

By means of the above-mentioned steps, when constructing precoding codeword, the serving base station divides the precoding codeword into expected encoding codeword and leakage precoding codeword according to channel information, corrects the obtained precoding codeword to better focus transmitted signal on the expected encoding codeword in the expected user terminal direction, and makes the interference signal on the leakage precoding codeword as small as possible to considerably improve the accuracy in reducing interference of edge user terminals when using the CoMP technology.

As a preferred implementation, step S204 can be realized in the following mode: the serving base station estimates a channel matrix between the terminal associated with the serving base station and the serving base station; calculates expected precoding codeword according to the channel matrix between the terminal associated with the serving base station and the serving base station; and acquiring the expected PMI according to the expected precoding codeword. It is certain that the above-mentioned step for acquiring the expected PMI can also be implemented by the serving base station. If both the serving base station and the user terminal need the expected PMI, this kind of scenario can be implemented by way of information interaction. Here, the expected PMI and the leakage PMI are acquired by way of singular value decomposition of the channel matrix, and it is certain that the expected PMI and the leakage PMI can also be acquired through other mathematical treatments, so as to obtain the expected precoding codeword and the leakage precoding codeword, which can be selected according to specific requirements.

Likewise, step S206 can acquire the leakage PMI in the similar way, which specifically includes the following steps: the terminal associated with the cooperation base station estimates a channel matrix between the terminal associated with the cooperation base station and the serving base station; calculates leakage precoding codeword according to the channel matrix between the terminal associated with the cooperation base station and the serving base station; and acquiring the leakage PMI according to the leakage precoding codeword.

There are many ways for calculating the expected precoding codeword according to the channel matrix between the terminal associated with the serving base station and the serving base station: traversing all the codeword of a precoding codebook to determine ideal channels corresponding to all the codeword; traversing all the channels in the ideal channels to acquire the distance between the estimated value of the channel matrix and all the channels in the ideal channels; determining that the channel with the minimum distance is an expected branch ideal channel; and determining that the precoding codeword in the precoding codebook corresponding to the expected branch ideal channel are the expected precoding codeword. There are also many ways for comparison, for example, a common mathematical treatment can be used, and some other manual treatment can also be used.

In a similar way, same treatment for calculating leakage precoding codeword also exist: for example, performing singular value decomposition on the channel matrix between the terminal associated with the cooperation base station and the serving base station to obtain a channel estimation codeword matrix; traversing channel estimation codeword in the channel estimation codeword matrix to acquire the distance between the channel estimation codeword and the codeword in the codebook; and determining that the channel estimation codeword with the maximum codeword distance are the leakage precoding codeword.

It should be noted that the steps shown in the flowchart of the drawings can be executed, for example, in a computer system with a set of instructions executable by a computer, in addition, a logic order is shown in the flowchart, but the shown or described steps can be executed in a different order associated with some conditions.

In another embodiment, software for precoding based on CoMP is also provided, which is used for implementing the technical solution described in the above-mentioned embodiments and preferred embodiments.

In another embodiment, a storage medium is also provided, which stores the above-mentioned software for precoding based on CoMP, and the storage medium includes but is not limited to: optical disk, floppy disk, hard disk, erasable memory, etc.

Also provided in the embodiments of the present invention is a device for precoding based on CoMP. The device for precoding based on CoMP can be used to realize the above-mentioned method for precoding based on CoMP and the preferred implementation thereof, which were already explained and will not be described again. Below is the description of the modules involved in the device for precoding based on CoMP. As used below, the term "module" is a combination of the software and/or hardware which can realize predetermined functions. Although the system and method described in the following embodiments are better realized by software, hardware or the combination of software and hardware is also conceivable.

Figure 3:
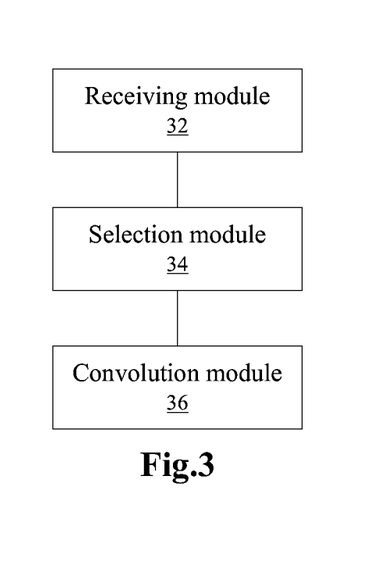
FIG. 3 is a structural diagram of a device for precoding based on CoMP according to the embodiments of the present invention.

FIG. 3 is a structural diagram of a device for precoding based on CoMP according to the embodiments of the present invention. As shown in FIG. 3, the device includes: a receiving module 32, a selection module 34, and a convolution module 36. Below is the detailed description of the above-mentioned structure. The receiving module 32 is configured to receive an expected PMI of a terminal and a leakage PMI of a terminal associated with a cooperation base station, which is sent by the cooperation base station, the expected PMI is corresponding to encoding codeword in an expected terminal direction, and the leakage PMI is corresponding to encoding codeword in an interference direction; the selection module 34 is connected to the receiving module 32 and is configured to select expected encoding codeword according to the expected PMI received by the receiving module 32 and select leakage precoding codeword according to the leakage PMI; and the convolution module 36 is connected to the selection module 34 and is configured to convolve the expected encoding codeword and the leakage precoding codeword obtained by the selection module 34 to obtain precoding codeword used for signal transmission by the serving base station.

Also provided in the embodiments of the present invention is a system for precoding based on CoMP. The system for precoding based on CoMP can be used to realize the above-mentioned method for precoding based on CoMP and the preferred implementation thereof, which were already explained and will not be described again. Below is the description of the modules involved in the system for precoding based on CoMP. As used below, the term "module" is a combination of the software and/or hardware which can realize predetermined functions. Although the system and method described in the following embodiments are better realized by software, hardware or the combination of software and hardware is also conceivable.

Figure 4:
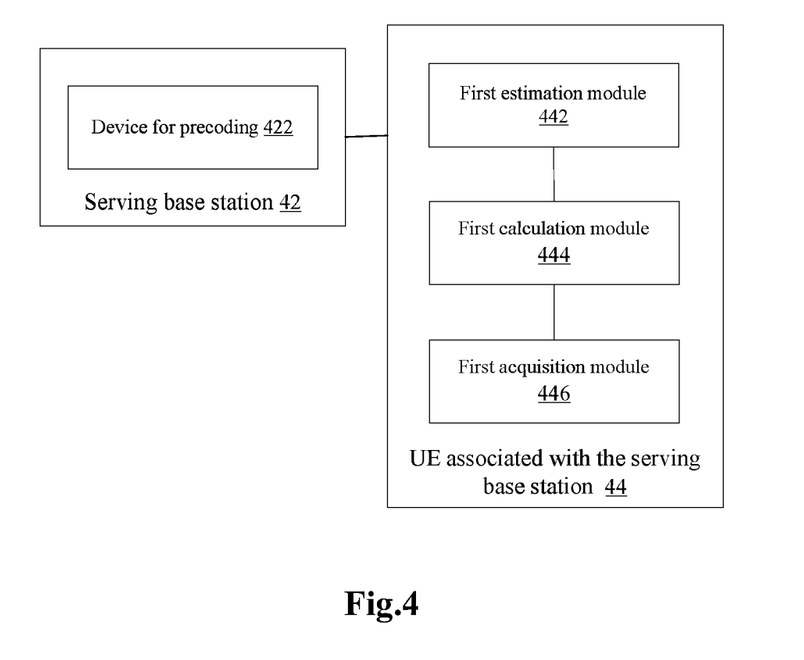
FIG. 4 is a structural diagram of a system for precoding based on CoMP according to the embodiments of the present invention.

FIG. 4 is a structural diagram of a system for precoding based on CoMP according to the embodiments of the present invention. As shown in FIG. 4, the system includes a serving base station 42, and the serving base station can use the above-mentioned device 422 for precoding based on CoMP. The system also includes a terminal 44 associated with the serving base station, and the terminal 44 associated with the serving base station includes: a first estimation module 442, a first calculation module 444, and a first acquisition module 446. Below is the detailed description of the above-mentioned structure.

The first estimation module 442 is configured to estimate a channel matrix between the terminal where the estimation module resides and the serving base station; the first calculation module 444 is connected to the first estimation module 442 and is configured to calculate expected precoding codeword according to the channel matrix between the terminal and the serving base station, which is obtained by the first estimation module 442; and the first acquisition module 446 is connected to the first calculation module 444 and is configured to acquire an expected PMI according to the expected precoding codeword obtained by the first calculation module 444.

Preferably, the first calculation module 444 includes: a first traversal module configured to traverse all the codeword of a precoding codebook to determine ideal channels corresponding to all the codeword; a second traversal module configured to traverse all the channels in the ideal channels to acquire the distance between the estimated value of the channel matrix and all the channels in the ideal channels; a first determination module configured to determine that the channel with the minimum distance is an expected branch ideal channel; and a second determination module configured to determine that the precoding codeword in the precoding codebook corresponding to the expected branch ideal channel are the expected precoding codeword.

Figure 5:
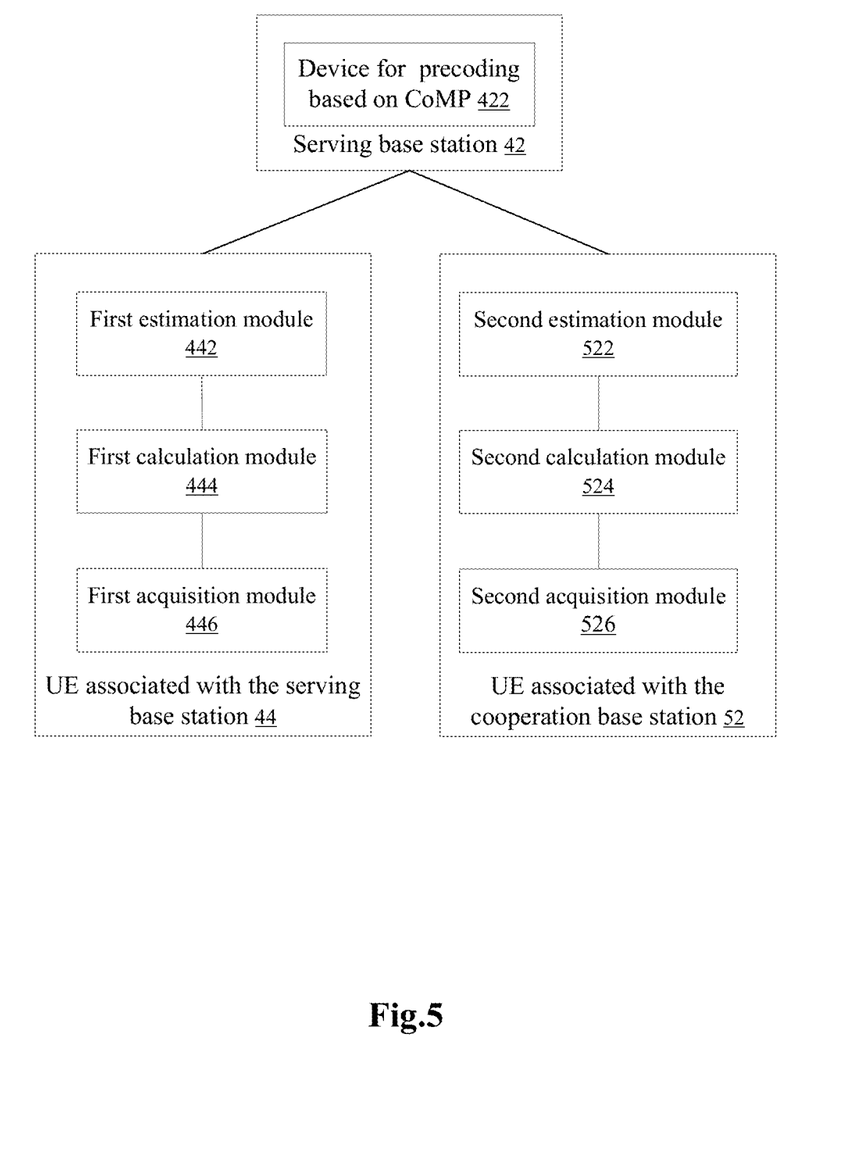
FIG. 5 is an optimal structural diagram of the system for precoding based on CoMP according to the embodiments of the present invention.

FIG. 5 is an optimal structural diagram of the system for precoding based on CoMP according to the embodiments of the present invention. As shown in FIG. 5, the system also includes: a terminal 52 associated with a cooperation base station corresponding to the serving base station, wherein the terminal 52 associated with the cooperation base station corresponding to the serving base station includes: a second estimation module 522, a second calculation module 524, and a second acquisition module 526. Below is the detailed description of the above-mentioned structure.

The second estimation module 522 is configured to estimate a channel matrix between the terminal associated with the cooperation base station and the serving base station; the second calculation module 524 is connected to the second estimation module 522 and is configured to calculate leakage precoding codeword according to the channel matrix between the terminal associated with the cooperation base station and the serving base station, which is obtained by the second estimation module 522; and the second acquisition module 526 is connected to the second calculation module 524 and is configured to acquire a leakage PMI according to the leakage precoding codeword obtained by the second calculation module 524.

Preferably, the second calculation module 524 includes: a first decomposition module configured to perform singular value decomposition on the channel matrix between the terminal associated with the cooperation base station and the serving base station to obtain a channel estimation codeword matrix; a third traversal module configured to traverse channel estimation codeword in the channel estimation codeword matrix to acquire the distance between the channel estimation codeword and the codeword in the codebook; and a third determination module configured to determine that the channel estimation codeword with the maximum codeword distance are the leakage precoding codeword.

Below is the description in combination with preferred embodiments. The following preferred embodiments combine the above-mentioned embodiments and preferred implementation.

Preferred Embodiment 1

The purpose of the present invention is to provide a method for realizing CoMP precoding based on codeword correction. The ideal channel corresponding to the precoding is calculated in offline way and form a table. In fact, the calculation can be realized only by searching the table, thereby greatly reducing the real-time calculation amount. Below is the description of the method.

It should be noted that, in this preferred embodiment, the following is assumed: there are K eNBs, each cell just serves one UE, and the UE served by each cell uses one and the same time-frequency resource, each eNB has M transmitting antennas, and the Kth user contains $N_k$ receiving antennas, and the user k needs to transmit $m_k$ independent data streams. The signal sent by a certain $eNB_k$ (k=1, 2, ... K) can be represented by an M dimensional column vector $W_k s_k$, where $W_k$ is the $M \times m_k$ dimensional precoding matrix of the user k and satisfies $tr(W_k W_k^H) = m_k$, $tr()$ represents a trace operation, the upper corner mark H represents a conjugate transpose operation, and $S_k$ is the $m_k$ dimensional transmitting signal vector of the user k.

In the two-cell-two-user scenario, assuming that $UE_1$ is the expected user and has universality, then the process for realizing the precoding of the user $UE_1$ is as follows:

S1: estimating the channel.

For the serving base station $eNB_1$, the mobile user $UE_1$ at the present cell estimates the channel matrix $H_{11}$ between UE1 and the serving base station $eNB_1$ and the channel matrix $H_{12}$ between UE1 and the cooperation base station $eNB_2$.

For the cooperation base station $eNB_2$, the mobile user $UE_2$ at the present cell estimates the channel matrix $H_{22}$ between UE2 and the serving base station $eNB_2$ and the channel matrix $H_{21}$ between UE2 the cooperation base station $eNB_1$.

S2: calculating expected precoding codeword.

(1) At the $UE_1$ side, selecting a codeword from a precoding codebook (which is, for example, determined in the LTE protocol), traversing the codeword (i is the sequence number of the codeword in the corresponding codebook) in the codebook, and obtaining the ideal channel $H_1$ corresponding to the codeword, i.e. $H_i=w_i^H \text{Pinv}(w_i w_i^H)$, where Pinv( ) represents the pseudo-inverse operation. Then a mapping table between precoding codewords and ideal channels is constructed, which is as shown in table 1:

TABLE 1

Precoding-ideal channel mapping table

| PMI sequence number | Precoding codeword | Ideal channel |
|---|---|---|
| 0 | $W_0$ | $H_0$ |
| 1 | $W_1$ | $H_1$ |
| 2 | $W_2$ | $H_2$ |
| ... | ... | ... |
| i | $W_i$ | $H_i$ |
| ... | ... | ... |

Assuming that the channel obtained through channel estimation is $\hat{H}_{11}$, then traversing the distance between the estimated channel $\hat{H}_{11}$ and the channel $H_i$ in the precoding-ideal channel table, and the one with the minimum distance is the expected branch ideal channel $H_{11}$:

$$H_{11} = \arg\min_{H_i} |(H_i - \hat{H}_{11})(H_i - \hat{H}_{11})^H|.$$

Then, the expected precoding codeword $W_{11}$ is obtained by looking up the table 1.

The upper corner mark "H" represents the conjugate transpose operator, and | | means to obtain the value of the determinant.

$$\arg\min_{H_i} |(H_i - \hat{H}_{11})(H_i - \hat{H}_{11})^H|$$

means to select the ideal channel corresponding to the minimum absolute value of the determinant | | as the expected branch ideal channel $H_{11}$, and the corresponding PMI is $PMI_{11}$, and $UE_1$ feeds back $PMI_{11}$ to the base station $eNB_1$ of the present cell.

Likewise, at the $UE_2$ side, assuming that the channel obtained through channel estimation is $\hat{H}_{22}$, then traversing the distance between the estimated channel $\hat{H}_{22}$ and the channel $H_i$ in the precoding-ideal channel table, and the one with the minimum distance is the expected branch ideal channel $H_{22}$:

$$H_{22} = \arg\min_{H_i} |(H_i - \hat{H}_{22})(H_i - \hat{H}_{22})^H|.$$

Then the expected precoding codeword $W_{22}$ is obtained by looking up the table 1. The corresponding PMI is $PMI_{22}$, and $UE_2$ feeds back $PMI_{22}$ to the base station $eNB_2$ of the present cell.

(3) Estimating the leakage precoding codeword. At the $UE_1$ side, selecting a codeword from the precoding codebook (which is, for example, determined in the LTE protocol), traversing the codeword $W_i$ (i is the sequence number of the codeword in the corresponding codebook) in the codebook, and performing singular value decomposition on the channel matrix $H_{12}$, i.e. $H_{12}=U_{12}\epsilon_{12}V_{12}^H$, to obtain the channel estimation codeword matrix $W_{H_{12}}$:

$$W_{H_{12}} = V_{12,[mk]}$$

where $V_{12,[mk]}$ is the first $m_k$ columns of $V_{12}$, $H_{12}$ is the $N_k \times M$ dimensional channel matrix between the user $UE_1$ and the base station $eNB_2$ of the neighboring cell, $U_{12}$ is the $N_k \times M$ dimensional matrix, $V_{12}$ is the $M \times M$ dimensional matrix, $\epsilon_{12}=\text{diag}(\sigma_1, \sigma_2, \ldots, \sigma_r)$, $r=\text{rank}(H_{12})$, diag represents the diagonal matrix, rank( ) represents the rank operation, and $\sigma_1, \sigma_2, \ldots, \sigma_r$ are singular values of the channel matrix $H_{12}$. The upper corner mark H of $V_{12}^H$ represents the conjugate transpose operator.

Then calculating the distance between the channel estimation codeword $W_{H_{12}}$ and the codeword $W_i$ in the codebook, and the one with the maximum codeword distance is the leakage precoding codeword $W_{12}$:

$$W_{12} = \arg\min_{W_i} |(W_i - W_{H_{21}})(W_i - W_{H_{21}})^H|$$

where the upper corner mark "H" represents the conjugate transpose operator, and | | means to obtain the value of the determinant.

$$W_{21} = \arg\min_{W_i} |(W_i \ W_{H_{21}})(W_i \ W_{H_{21}})^H|$$

means to select the codeword corresponding to the maximum absolute value of the determinant | | as the leakage precoding codeword $W_{12}$, and the corresponding PMI is $WCI_{12}$, and $UE_1$ feeds back $WCI_{12}$ to the base station $eNB_1$ of the present cell.

Likewise, at the UE2 side, performing singular value decomposition on the channel matrix $H_{21}$ to obtain the channel estimation codeword matrix $W_{H_{12}}$ and then to obtain the leakage precoding codeword $W_{21}$:

$$W_{21} = \arg\min_{W_i} |(W_i - W_{H_{21}})(W_i - W_{H_{21}})^H|.$$

The corresponding PMI is $WCI_{21}$, and $UE_2$ feeds back $WCI_{21}$ to the base station $eNB_2$ of the present cell.

S4: exchanging information.

The serving base station $eNB_1$ exchanges channel information with the cooperation base station $eNB_2$ via the interface (X2 interface) between the base stations, i.e. the base station $eNB_1$ transmits the PMI $WCI_{12}$ to the base station $eNB_2$, and the base station $eNB_2$ transmits the PMI $WCI_{21}$ to the base station $eNB_1$.

S5: constructing precoding codeword, convolving the expected encoding codeword $W_{11}$ and the leakage precoding codeword $W_{21}$ on the base station $eNB_1$, and taking the matrix that is obtained as the precoding codeword, thereby ensuring that the signal power of the expected user is the highest and the interference is suppressed to almost zero. For the cell $eNB_1$, the precoding of the neighboring cell user UE$_2$, which is corresponding to the present cell user UE$_1$, is obtained, i.e. W$_1$=conv$_{size(W_{11})}$(W$_{11}$,W$_{21}$). conv$_{size(W_{11})}$(W$_{11}$, W$_{21}$) represents an convolution operation on the matrix W$_{11}$ and the matrix W$_{21}$, and the part in the result matrix centre where the column is the same as W$_{11}$ is taken to constitute the matrix.

S6: precoding the signal and transmitting same.

In this preferred embodiment, during the CoMP precoding in the LTE-Advanced system, the expected precoding codeword are selected according to the PMI fed back by the UE in FIG. 1, the leakage precoding codeword are selected according to the PMI exchanged by the neighboring cell, and then the expected precoding codeword matrix and the leakage precoding codeword matrix are convolved to obtain the precoding, and the precoding is corrected, thereby ensuring that the signal power of the expected user is the highest and the interference is suppressed to almost zero.

Preferred Embodiment 2

In the CoMP precoding of this preferred embodiment, considering that the precoding gain of the present cell user is relatively large, and the user of the same time-frequency resource in the neighboring cell has zero leakage, the precoding codeword is constructed according to the channel information as follows: the precoding of the user transmitted signal is equivalent to the convolution form of the expected precoding codeword and the leakage precoding codeword, the expected precoding forms an energy convergence in the expected user direction, while the leakage precoding forms zero leakage in each interference direction, thereby acquiring possibly high signal interference noise ratio at the receiving end of the expected user and suppressing interference in each interference direction at the same time. In addition, this method facilitates the off-line calculation of the ideal channel corresponding to the precoding, and the formation of the table, thereby greatly reducing the real-time calculation amount.

Figure 6:
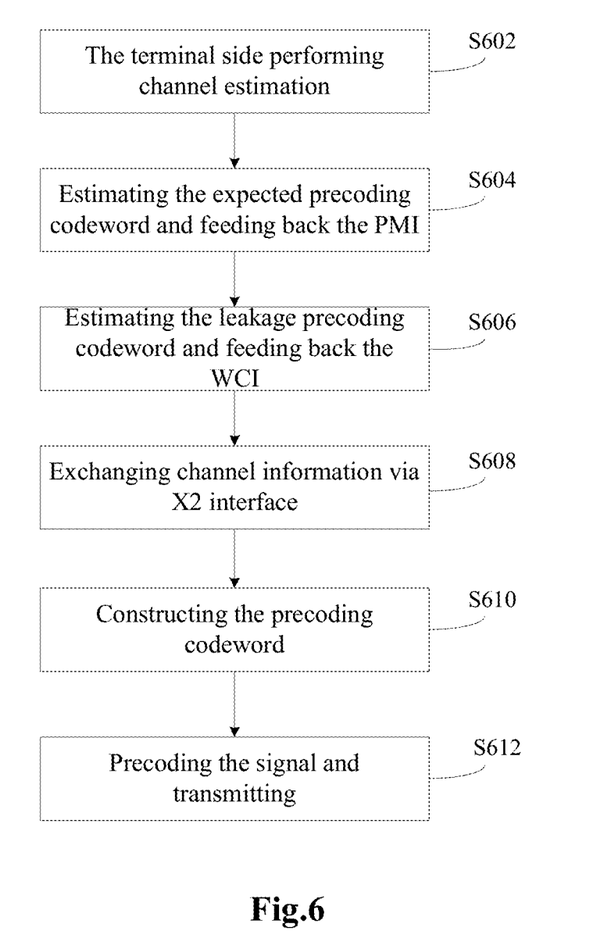
FIG. 6 is a flow chart of the method for precoding based on CoMP according to the preferred embodiments of the present invention.

In this preferred embodiment, the scenario where there are two base station cells is taken for example. It should be noted that in the method for realizing CoMP precoding in the two-cell scenario provided in this preferred embodiment, the number of transmitting antennas of eNB$_1$ and eNB$_2$ is both 4, and the number of receiving antennas of UE$_1$ and UE$_2$ is both 2, and the number of layers of each UE is 2. FIG. 6 is a flow chart of the method for precoding based on CoMP according to the preferred embodiments of the present invention. As shown in FIG. 6, the flow includes the following steps:

step S602: estimating the channel matrix H$_{11}$ between the base station eNB$_1$ and the present cell user UE$_1$, and the channel matrix H$_{21}$ between the base station eNB$_1$ and the neighboring cell user UE$_2$.

For the cooperation cell eNB$_2$, estimating the channel matrix H$_{22}$ between the cooperation base station eNB$_2$ and the present cell user UE$_2$, and the channel matrix H$_{12}$ between the cooperation base station eNB$_2$ and the neighboring cell user UE$_2$.

Step S604: estimating the expected precoding codeword. At the UE$_1$ side, selecting the codeword from the precoding codebook, traversing the codeword W$_i$ (for the 4 antennas, i=0, 1, . . . , 15) in the codebook, and obtaining the ideal channel H$_i$ corresponding to the codeword, i.e. H$_i$=w$_i^H$Pinv (w$_i$w$_i^H$). Therefore, the mapping table 2 between the precoding codeword and the ideal channels is constructed as follows:

TABLE 2

Precoding-ideal channel mapping table

| PMI sequence number | Precoding codeword | Ideal channel |
|---|---|---|
| 0 | W$_0$ | H$_0$ |
| 1 | W$_1$ | H$_1$ |
| 2 | W$_2$ | H$_2$ |
| . . . | . . . | . . . |
| i | W$_i$ | H$_i$ |
| . . . | . . . | . . . |
| 14 | W$_{14}$ | H$_{14}$ |
| 15 | W$_{15}$ | H$_{15}$ |

In fact, H$_i$ in Table 1 can be calculated first and then stored in the memory. It is only needed to directly look up the table during actual evaluation, thereby greatly reducing the real-time calculation amount and, at the same time, improving the calculation accuracy.

Assuming that the channel obtained through channel estimation is $\hat{H}_{11}$, then traversing the distance between the estimated channel $\hat{H}_{11}$ and the channel H$_1$ in the precoding-ideal channel table, and the one with the minimum distance is the expected branch ideal channel H$_{11}$:

$$H_{11} = \underset{H_i}{\mathrm{argmin}}\left|(H_i - \hat{H}_{11})(H_i - \hat{H}_{11})^H\right|$$

Then the expected precoding codeword W$_{11}$ is obtained by look up the table 1.

The upper corner mark "H" represents the conjugate transpose operator, and | | means to obtain the value of the determinant.

$$\underset{H_i}{\mathrm{argmin}}\left|(H_i - \hat{H}_{11})(H_i - \hat{H}_{11})^H\right|$$

means to select the ideal channel corresponding to the minimum absolute value of the determinant | | as the expected branch ideal channel H$_{11}$, and the corresponding PMI is PMI$_{11}$, and UE$_1$ feeds back PMI$_{11}$ to the base station eNB$_1$ of the present cell.

Likewise, at the UE$_2$ side, assuming that the channel obtained through channel estimation is $\hat{H}_{22}$, then traversing the distance between the estimated channel $\hat{H}_{22}$ and the channel H$_i$ in the precoding-ideal channel table, and the one with the minimum distance is the expected branch ideal channel H$_{22}$:

$$H_{22} = \underset{H_i}{\mathrm{argmin}}\left|(H_i - \hat{H}_{22})(H_i - \hat{H}_{22})^H\right|$$

Then the expected precoding codeword W$_{22}$ is obtained by looking up the table 1. The corresponding PMI is PMI$_{22}$, and UE$_2$ feeds back PMI$_{22}$ to the base station eNB$_2$ of the present cell.

Step S606: estimating the leakage precoding codeword W$_{12}$.

the leakage precoding codeword is estimated. At the UE$_1$ side, selecting a codeword from the precoding codebook (which is, for example, determined in the LTE protocol), and traversing the codeword W$_i$ (i is the sequence number of the codeword in the corresponding codebook) in the codebook. The precoding codeword $W_{12}$ is:

$$W_{12} = \arg\min_{W_i} |(W_i - W_{H_{12}})(W_i - W_{H_{12}})^H|,$$

where the upper corner mark "H" represents the conjugate transpose operator, and | | means to obtain the value of the determinant.

$$\arg\min_{W_i} |(W_i - W_{H_{12}})(W_i - W_{H_{12}})^H|$$

means to select the codeword corresponding to the minimum absolute value of the determinant | | as the estimated value $W_{12}$ of the expected precoding codeword, and the corresponding PMI is $WCI_{12}$, and $UE_1$ feeds back $WCI_{12}$ to the base station $eNB_1$ of the present cell.

Likewise, at the $UE_2$ side, the leakage precoding codeword $W_{21}$ is obtained:

$$W_{21} = \arg\min_{W_i} |(W_i - W_{H_{21}})(W_i - W_{H_{21}})^H|,$$

and the corresponding PMI is $WCI_{21}$, and $UE_2$ feeds back $WCI_{21}$ to the base station $eNB_2$ of the present cell.

Step S608: exchanging information. The serving base station $eNB_1$ exchanges channel information with the cooperation base station $eNB_2$ via X2 interface, i.e. the base station $eNB_1$ transmits the PMI $WCI_{12}$ to the base station $eNB_2$, and the base station $eNB_2$ transmits the PMI $WCI_{21}$ to the base station $eNB_1$.

Step S610: constructing precoding codeword, and obtaining the precoding codeword of the present cell user $UE_1$ and the neighboring cell user $UE_2$, which are corresponding to the base station $eNB_1$, via the mapping between the expected precoding codeword $W_1$ and the leakage precoding codeword $W_2$, i.e. $W_1 = \text{conv}_{size(W_{11})}(W_{11}, W_{21})$. $\text{conv}_{size(W_{11})}(W_{11}, W_{21})$ represents an convolution operation on the matrix $W_{11}$ and the matrix $W_{21}$, and the part in the result matrix centre where the column is the same as $W_{11}$ is taken to constitute the matrix.

Step S612: the process of procoding. For the base station $eNB_1$, procoding of the transmitted signal x is performed according to the estimated precoding codeword $W_1$, i.e. $W_{1x}$.

For the cooperation base station $eNB_2$, the process of precoding is similar to the base station $eNB_1$ and it will not be described here.

Figure 7:
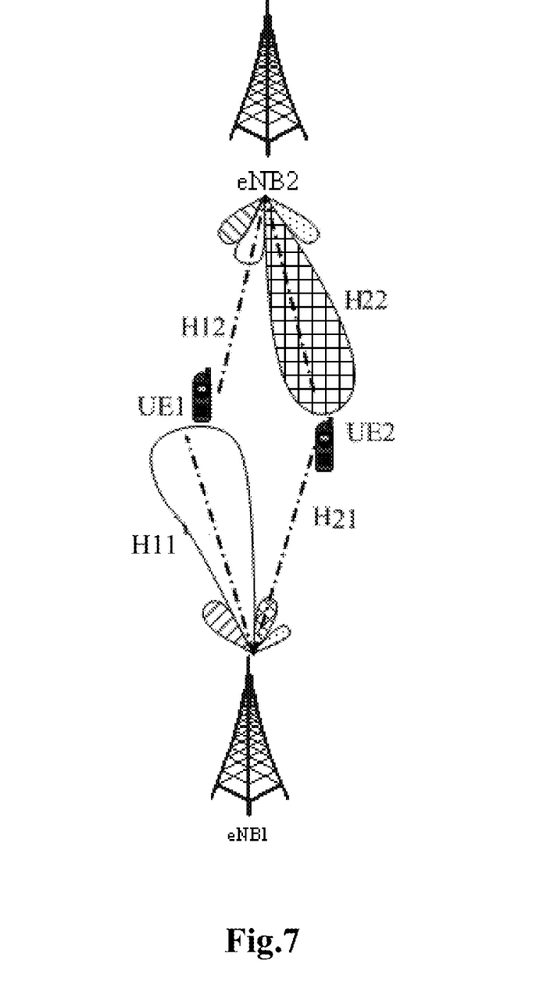
FIG. 7 is a schematic diagram of the implementation effect of CoMP precoding based on codeword correction according to the preferred embodiments of the present invention.

FIG. 7 is a schematic diagram of the implementation effect of the codebook-based CoMP precoding according to the embodiments of the present invention. As shown in FIG. 7, for the serving base station $eNB_1$, after precoding the energy is converged to the present cell user $UE_1$ and tends towards the neighboring cell user $UE_2$; and for the cooperation base station $eNB_2$, after precoding the energy is converged to the present cell user $UE_2$ and tends towards the neighboring cell user $UE_1$.

Figure 8:
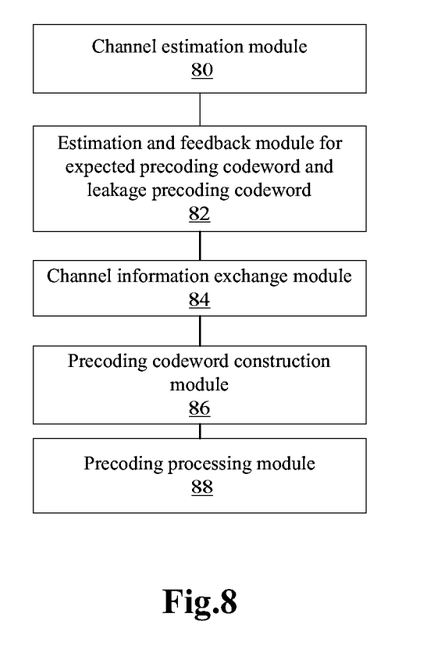
FIG. 8 is a structural diagram of a device realizing CoMP precoding based on codeword correction according to the preferred embodiments of the present invention.

In this preferred embodiment, a precoding realization device is also provided, which is applied in the LTE-Advanced system. FIG. 8 is a structural diagram of a CoMP precoding device according to the preferred embodiments of the present invention. As shown in FIG. 8, the device includes: a channel estimation module 80, an estimation and feedback module 82 for expected precoding codeword and leakage precoding codeword, a channel information exchange module 84, a precoding codeword construction module 86, and a precoding processing module 88. Below is the detailed description of the above-mentioned structure.

For the serving cell $eNB_1$, the channel estimation module 80 at the terminal side is configured to estimate the channel matrix $H_{11}$ between the user $UE_1$ and the base station $eNB_1$, and to estimate the channel matrix $H_{12}$ between the user $UE_1$ and the base station $eNB_2$.

Likewise, for the cooperation cell $UE_2$, the module is used to estimate the channel matrix $H_{22}$ between the user $UE_2$ and the base station $eNB_2$, and to estimate the channel matrix $H_{21}$ between the user $UE_2$ and the base station $eNB_1$.

The estimation and feedback module 82 for expected precoding codeword and leakage precoding codeword is connected to the channel estimation module 80 and is configured to establish the relationship with the expected precoding and leakage precoding according to the channel outputted by the channel estimation module 80. The channel information exchange module 84 is connected to the estimation and feedback module 82 for expected precoding codeword and leakage precoding codeword and is configured to exchange and transmit channel information.

The precoding codeword construction module 86 is connected to the channel information exchange module 84 and is configured to generate the CoMP precoding in the cell.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention, for those skilled in the art, the present invention may have various changes and variations. Any amendments, equivalent substitutions, improvements, etc. within the principle of the present invention are all included in the scope of the protection of the present invention.

What is claimed is:

1. A method for precoding based on coordinated multipoint transmission, comprising:
  a serving base station receiving an expected Precoding Matrix Indicator (PMI) of a terminal associated with the serving base station and a leakage PMI of a terminal associated with a cooperation base station, and the leakage PMI is sent by the cooperation base station, wherein the expected PMI is corresponding to encoding codeword in an expected terminal direction, and the leakage PMI is corresponding to encoding codeword in an interference direction;
  the serving base station selecting expected encoding codeword according to the expected PMI and selecting leakage precoding codeword according to the leakage PMI; and
  the serving base station convolving the expected encoding codeword and the leakage precoding codeword to obtain precoding codeword used for signal transmission by the serving base station.

2. The method according to claim 1, wherein before the serving base station receives the expected PMI of the terminal associated with the serving base station, the method further comprises:
the terminal associated with the serving base station estimating a channel matrix between the terminal associated with the serving base station and the serving base station;
calculating expected precoding codeword according to the channel matrix between the terminal associated with the serving base station and the serving base station; and
acquiring an expected PMI according to the expected precoding codeword.

3. The method according to claim 2, wherein calculating expected precoding codeword according to the channel matrix between the terminal associated with the serving base station and the serving base station comprises:
traversing all the codeword of a precoding codebook to determine ideal channels corresponding to all the codeword;
traversing all the ideal channels to acquire the distance between the estimated value of the channel matrix and all the channels in the ideal channels;
determining that the channel with the minimum distance is an expected ideal channel; and
determining that the precoding codeword in the precoding codebook corresponding to the expected branch ideal channel are the expected precoding codeword.

4. The method according to claim 1, wherein before receiving a leakage PMI of a terminal associated with a cooperation base station, which is sent by the cooperation base station, the method further comprises:
the terminal associated with the cooperation base station estimating a channel matrix between the terminal associated with the cooperation base station and the serving base station;
calculating leakage precoding codeword according to the channel matrix between the terminal associated with the cooperation base station and the serving base station; and
acquiring the leakage PMI according to the leakage precoding codeword.

5. The method according to claim 4, wherein calculating leakage precoding codeword according to the channel matrix between the terminal associated with the cooperation base station and the serving base station comprises:
performing singular value decomposition on the channel matrix between the terminal associated with the cooperation base station and the serving base station to obtain a channel estimation codeword matrix;
traversing channel estimation codeword in the channel estimation codeword matrix to acquire the distance between the channel estimation codeword and the codeword in the codebook; and
determining that the channel estimation codeword with the maximum codeword distance is the leakage precoding codeword.

6. A serving base station, which comprises a first hardware processor and a first memory, wherein the first processor is configured to execute the program modules stored in the first memory, and the program modules comprise:
a receiving module, configured to receive an expected Precoding Matrix Indicator (PMI) of a terminal and a leakage PMI of a terminal associated with a cooperation base station, the leakage PMI is sent by the cooperation base station, wherein the expected PMI is corresponding to encoding codeword in an expected terminal direction, and the leakage PMI is corresponding to encoding codeword in an interference direction;
a selection module, configured to select expected encoding codeword according to the expected PMI and select leakage precoding codeword according to the leakage PMI; and
a convolution module, configured to convolve the expected encoding codeword and the leakage precoding codeword to obtain precoding codeword used for signal transmission by the serving base station.

7. A system for precoding based on coordinated multipoint transmission, comprising a serving base station as claimed in claim 6, and a terminal associated with the serving base station, wherein the terminal associated with the serving base station comprises a second hardware processor and a second memory, wherein the second processor is configured to execute the program modules stored in the second memory, and the program modules stored in the second memory comprise:
a first estimation module, configured to estimate a channel matrix between the terminal and the serving base station;
a first calculation module, configured to calculate expected precoding codeword according to the channel matrix between the terminal and the serving base station; and
a first acquisition module, configured to acquire an expected PMI according to the expected precoding codeword.

8. The system according to claim 7, wherein the first calculation module comprises:
a first traversal module, configured to traverse all the codeword of a precoding codebook to determine ideal channels corresponding to all the codeword;
a second traversal module, configured to traverse all the channels in the ideal channels to acquire the distance between the estimated value of the channel matrix and all the channels in the ideal channels;
a first determination module, configured to determine that the channel with the minimum distance is an expected ideal channel; and
a second determination module, configured to determine that the precoding codeword in the precoding codebook corresponding to the expected branch ideal channel is the expected precoding codeword.

9. The system according to claim 7, wherein the system further comprises a terminal associated with a cooperation base station corresponding to the serving base station, the terminal associated with a cooperation base station corresponding to the serving base station comprises a third hardware processor and a third memory, wherein the third processor is configured to execute the program modules stored in the third memory, and the program modules stored in the third memory comprise:
a second estimation module, configured to estimate a channel matrix between the terminal associated with the cooperation base station and the serving base station;
a second calculation module, configured to calculate leakage precoding codeword according to the channel matrix between the terminal associated with the cooperation base station and the serving base station; and a second acquisition module, configured to acquire a leakage PMI according to the leakage precoding codeword.

10. The system according to claim 9, wherein the second calculation module comprises:
a first decomposition module, configured to perform singular value decomposition on the channel matrix between the terminal associated with the cooperation base station and the serving base station to obtain a channel estimation codeword matrix;
a third traversal module, configured to traverse channel estimation codeword in the channel estimation codeword matrix to acquire the distance between the channel estimation codeword and the codeword in the codebook; and
a third determination module, configured to determine that the channel estimation codeword with the maximum codeword distance are the leakage precoding codeword.

* * * * *